United States Patent [19]

Geluk

[11] Patent Number: 4,772,953
[45] Date of Patent: Sep. 20, 1988

[54] METHOD FOR PROCESSING PICTURE INFORMATION HAVING A LARGE DYNAMIC RANGE WITH A TELEVISION CAMERA TUBE, AND ALSO A DEVICE FOR APPLYING THE METHOD

[75] Inventor: Ronald J. Geluk, Nootdorp, Netherlands

[73] Assignee: B. V. Optische Industrie "De Oude Delft", Delft, Netherlands

[21] Appl. No.: 924,306

[22] Filed: Oct. 28, 1986

[30] Foreign Application Priority Data

Oct. 30, 1985 [NL] Netherlands ......................... 8502970

[51] Int. Cl.$^4$ ....................... H04N 5/228; H04N 5/235
[52] U.S. Cl. ...................................... 358/219; 358/223
[58] Field of Search ................ 358/217, 219, 223, 228, 358/220

[56] References Cited

U.S. PATENT DOCUMENTS

| | | | |
|---|---|---|---|
| 3,691,302 | 9/1972 | Gaebele et al. | 358/219 |
| 3,955,116 | 5/1976 | van den Berg | 358/219 |
| 4,229,767 | 10/1980 | Ryan | 358/219 |
| 4,365,271 | 12/1982 | Blom | 358/219 |
| 4,379,310 | 4/1983 | Bendell | 358/219 |
| 4,380,028 | 4/1983 | Pepin et al. | 358/219 |
| 4,387,403 | 6/1983 | van Buul | 358/219 |

*Primary Examiner*—Jin F. Ng
*Assistant Examiner*—Stephen Brinich
*Attorney, Agent, or Firm*—Louis E. Marn

[57] ABSTRACT

The blooming effect in pictures of a television camera tube (such as a vidicon, an orthicon or an isocon) is counteracted by setting the cathode potential to a first standard value during one scan of the scanning electron beam and to a second value during a number of subsequent scans of the scanning electron beam. During the one scan picture information is obtained both about bright and dark parts of the picture. During the subsequent scans only picture information is obtained from relatively bright parts of the picture. The videosignals of the different scannings are stored and combined. The resulting combined videosignal comprises picture information about bright or dark parts of the image that otherwise would have been lost.

9 Claims, 2 Drawing Sheets

METHOD FOR PROCESSING PICTURE INFORMATION HAVING A LARGE DYNAMIC RANGE WITH A TELEVISION CAMERA TUBE, AND ALSO A DEVICE FOR APPLYING THE METHOD

The invention relates to a method for processing picture information having a large dynamic range with a television camera tube, and also to a device for applying the method.

In certain situations the problem arises in using television camera tubes that the dynamic range of the picture information presented is larger than the dynamic range of the television camera tube itself. The output signal of the television camera tube then contains less picture information than the original image and may, in addition, be distorted. An example of such a distortion is the very disturbing spreading of bright picture elements, the so-called 'blooming' effect.

The 'blooming' effect can certainly be counteracted by increasing the intensity of the electron beam scanning the target or photosensitive layer of the television camera tube, but this leads to a loss of picture sharpness (for example, in the case of the vidicon) or to noise at low signal level (for example, in the case of the orthicon and the isocon).

The object of the invention is therefore a method which makes it possible to process picture information having a large dynamic range with a standard television camera tube without the 'blooming' effect occurring and without increasing the intensity of the scanning electron beam.

For this purpose, according to the invention a method of the type described is characterized in that the cathode potential of the camera tube is in each case set, during one scanning movement of the scanning electron beam to a first standard value at which picture information is obtained both about bright and dark parts of the picture and is then set to a second value during a number of scanning movements at which only picture information from relatively bright parts of the picture is obtained.

In particular, the invention is suitable for application in x-ray television in which an x-ray image formed by an x-ray detector is picked up by a television camera tube and the output signals of the television camera tube are further processed to form a television picture, because, in general and particularly in the case of axial tomography, a very large dynamic range exists within the image formed by an x-ray detector. A device for applying the method according to the invention, comprising a television camera tube having a signal electrode and a picture signal output connected thereto, a charge image carrier, and a cathode by means of which the charge image carrier can be scanned with an electron beam, is characterized according to the invention in that the cathode is connected to a switch controlled by a clock device which applies either a first, standard voltage or a second voltage to the cathode, at which second voltage only the parts of the charge image carrier corresponding to the relatively bright parts of the picture result in a picture signal.

The invention will be described in more detail below with reference to the accompanying drawing.

Figure 1:
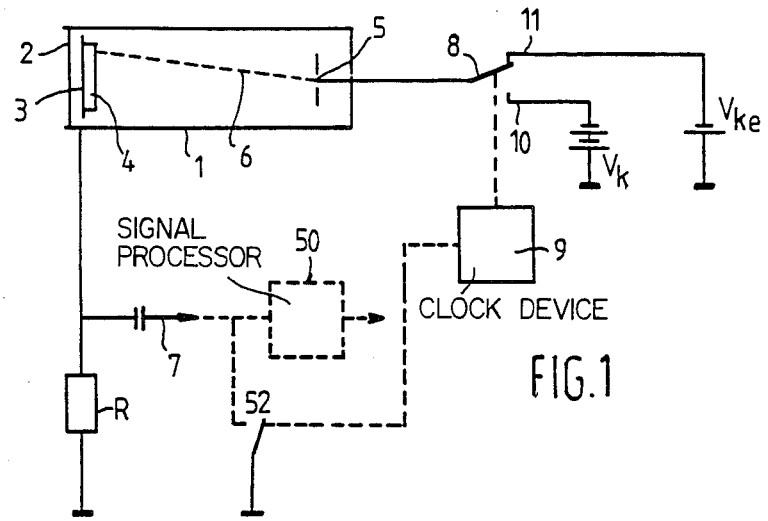
FIG. 1 shows diagrammatically a television camera tube connected to means for switching the cathode voltage.

FIG. 1 shows diagrammatically a television camera tube by means of which a method according to the invention can be carried out. The television camera tube comprises an envelope 1 with an input window 2, a transparent signal plate 3 which is provided with a photosensitive layer 4, and an electron gun or cathode 5. The signal plate is in this case connected to earth via a resistor R.

During operation, the photosensitive layer 4 is illuminated via the input window and the transparent signal plate, as a result of which a charge image is produced on the photosensitive layer.

The photosensitive layer may be thought of as built up of a number of capacitors which each represent a picture element. During operation, each capacitor is repeatedly partially discharged in accordance with the quantity of light incident at the spot as a result of the photoconductive or photoelectric effect which occurs.

The charge distribution produced by the picture presented is thus equalized point-wise by a scanning electron beam 6, a signal current being produced which flows to the signal plate via the resistor R. The picture signal can be taken off at 7. All this is shown diagrammatically in FIG. 2 for a single picture element.

Figure 2:
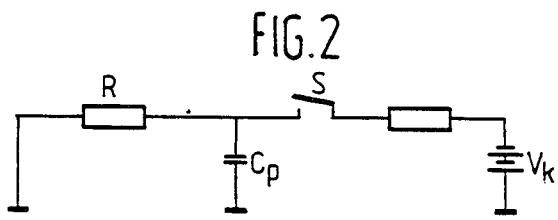
FIG. 2 shows an electrical equivalent-circuit diagram for explaining FIG. 1.

The picture element, or pixel, is represented in FIG. 2 by a capacitor $C_p$ which, as a result of the illumination of the photosensitive layer, is partially discharged.

A switch S represents the operation of the scanning electron beam. At the instant when the electron beam is directed at the picture element, the switch S is closed and the charge which has flowed out of the picture element since the previous scanning is replenished.

It is pointed out that FIG. 1 shows a camera tube of the type with a sensitive layer having photoconductive properties. The diagram in FIG. 2 and the invention are, however, also applicable to camera tubes having an image section and a target on which a charge image is formed which is scanned by an electron beam.

The 'blooming' effect mentioned above occurs if the scanning electron beam cannot completely neutralize the charge change of a picture element. This means that the charge on capacitor $C_p$ is not completely replenished by the electron beam.

According to the invention, the 'blooming' effect can therefore be obviated by scanning the picture elements which have been relatively strongly discharged (these are picture elements corresponding to the bright parts of the picture) more often so that a shorter time is available for building up the charge image in the bright picture elements. This is achieved according to the invention by scanning a number of times with a lower potential difference $V_{ke}$ between cathode and signal plate between every two scannings with a normal potential difference $V_k$ between cathode and signal plate.

The lower potential difference has the result that charge is only added to the bright picture elements, the building up of the charge image in the darker picture elements proceeding as normally until the subsequent scanning with the standard potential difference $V_k$.

All this is shown diagrammatically in FIG. 1 by the switch 8, which, under the control of a suitable clock device 9, connects the cathode 5, for example, in each case alternately once with the terminal 10 and four times with the terminal 11.

As a result of this method the charge in the bright picture elements can only reach at a much higher light level a value such that the 'blooming' effect occurs.

It is pointed out that the 'blooming' effect is also prevented if the entire image is scanned more often than normally is the case without changing the cathode potential. In that case, however, the charge integration time for the dark picture elements is also shortened which leads to a poorer signal/noise ratio in the dark parts of the picture and is thus undesirable.

The invention can be applied with advantage if x-ray television equipment is used in radiography equipment for axial tomography. In this case the picture presented, which has a very large dynamic range, consists in each case only of a small strip which only occupies a small part of the normally available scanning time of the camera tube (for example, 32 picture lines per field, provided care is at least taken to ensure that the strip-like image is parallel to the scanning direction of the electron beam).

By limiting the scanning to the region of the signal plate or photosensitive layer of the camera tube which is occupied by the strip-like image and at the same time maintaining the normal scanning frequency, the region corresponding to the strip-like image can for example be scanned six times. One scanning then takes place in the usual manner and 2 to 10, for example 5, scannings take place with a modified cathode voltage. The image integration time for the dark parts of the picture is then six times as long as the image integration time for the very bright parts of the picture. In fact, a compression of the dynamic range thus takes place on the signal plate. The image integration time on the signal plate or photosensitive layer is therefore dependent on the local intensity of the picture presented.

The information obtained during the scannings with modified cathode potential could be lost by not using said information in the further processing of the output signal of the camera tube. The important advantage, which is already satisfactory per se, of preventing the 'blooming' effect certainly remains operative in that case.

However, it is also possible to store the information obtained during the scannings with normal and/or modified cathode potential temporarily in a memory and then to combine them with each other or with the information not stored in the memory.

For example, by summing, which is repeated or not repeated, an output signal is obtained, the dynamic range of which is just as large as that of the picture originally presented, and for example, by storing the information obtained with normal cathode potential during the scanning period with modified cathode potential and simultaneously reading out the information stored in the memory an image is obtained by summing in which the bright parts of the picture acquire a higher resolution with respect to time than the dark parts of the picture.

Figure 3:
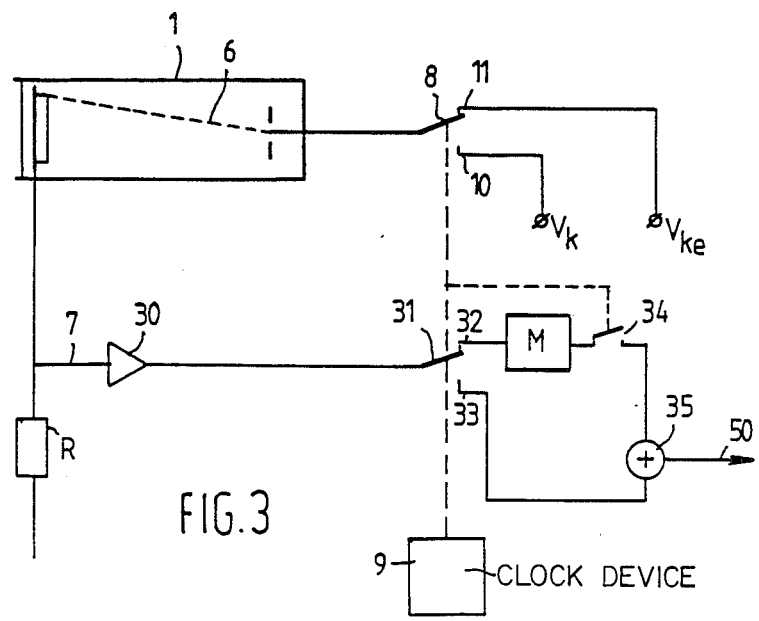
FIG. 3 illustrates a further development of the invention.

An example is shown diagrammatically in FIG. 3.

The video signal obtained during the scannings with increased cathode voltage is stored in a memory M via a preamplifier 30, a switch 31 controlled synchronously with the switch 8 by the clock device 9, and via a terminal 32. The output of the memory M is connected to an adding device 35 via a switch 34, which is operated synchronously with the switches 8 and 31 and which is opened when the switch 31 makes contact with the terminal 32.

For a normal scanning the switch 31 makes contact with the terminal 33 and the output signal of the preamplifier 30 is fed to the adding device 35. At the same time, the switch 34 is then closed so that the output signal of the memory M is combined in the adding device 35 with the output signal of the preamplifier which is present at that instant. Depending on the manner of combination in the adding device, the output signal $S_o$ of the adding device is then able to have the same dynamic range again as the picture originally presented.

The clock device 9 may be controlled in a simple manner on the basis of the usual synchronizing pulses.

A similar technique can be applied if not only a part of the target or sensitive plate of the camera tube but the entire surface thereof contains relevant picture information. By scanning at a normal scanning frequency in each case a number of times with a modified cathode voltage and once in the normal manner, virtually continuous information is obtained about the bright parts of the picture while image integration occurs in the dark parts of the picture over a number of scanning cycles. This improves the signal/noise ratio in the dark parts of the picture. In order nevertheless to obtain a complete video signal for each scanning in that case, the video signal obtained in the normal scanning can be stored until the following normal scanning in a memory which can be read out non-destructively. For each scanning with modified cathode voltage, the contents of the memory are added to the signal then obtained which represents the bright parts of the picture.

Figure 4:
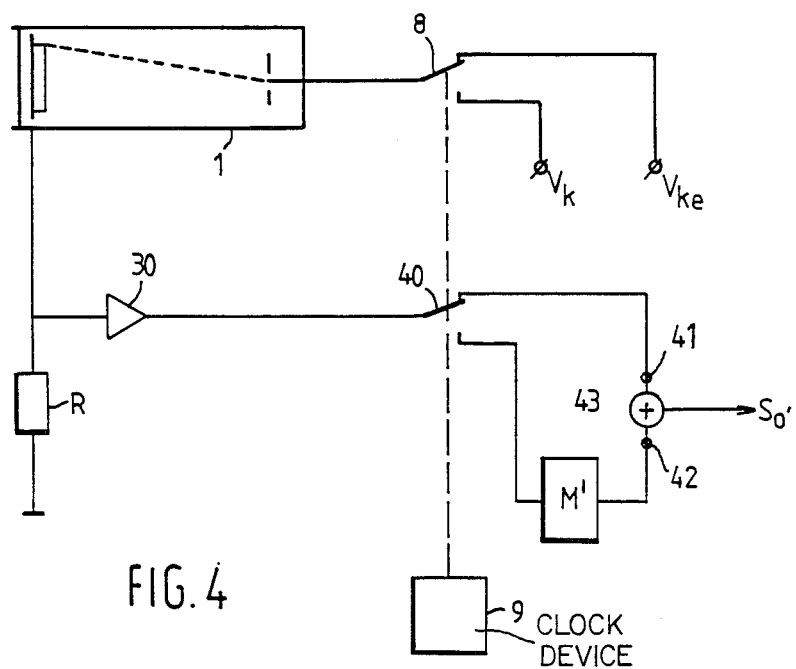
FIG. 4 illustrates a variation of FIG. 3.

All this is illustrated diagrammatically in FIG. 4. Every time the scanning takes place in the camera tube at the modified cathode voltage $V_{ke}$, the video signal obtained is fed via a switch 40 to one input terminal 41 of an adding device 43. The output signal of memory M' is fed to the other input terminal 42 of the adding device. This signal represents the video signal obtained during the previous normal scanning. After an output signal $S_o'$ has been assembled in this manner during a number of scanning cycles from a signal representing the bright parts of the picture and in an 'old' signal which represents the total picture, the switch 40 is reset synchronously with the switch 8 present in the cathode circuit of the camera tube and the contents of the memory M' are replaced. The output signal $S_o'$ of the adding device 43 at that instant represents the most recent complete video signal.

Figure 5:
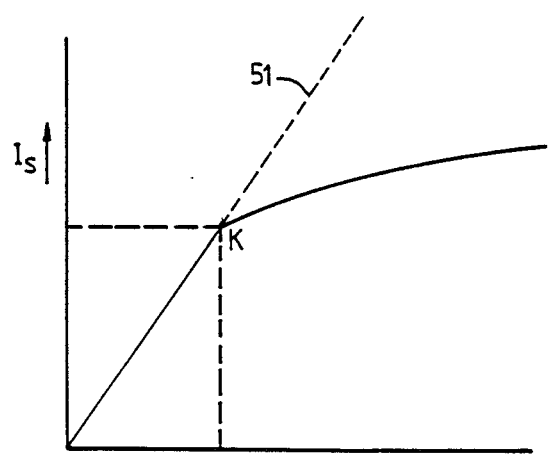
FIG. 5 shows a characteristic of a camera tube which reproduces the relationship between signal current and intensity of illumination.

It is pointed out that various modifications of the method and equipment described are obvious to those skilled in the art. Thus, it has been indicated above that it is possible in principle not to make further use of the information obtained during the scanning of the bright picture elements in the signal processing. The camera tube then acquires a characteristic having a bend, the position of which is determined by the value of the cathode voltage prevailing during the scanning with modified cathode voltage. Such a characteristic, which indicates the relationship between the signal current $I_s$ (the video signal) and the intensity of illumination X is shown in FIG. 5. Since the position of the bend K and also the curve of the levelling-off of the part of the characteristic situated beyond the bend are known, an electronic correction can be made in the further signal processing by means of a device, suitable for the purpose, indicated by the broken lines at 50 in FIG. 1. The video signal obtained during the scanning with increased cathode voltage is then discharged to earth, for example, via a switch 52 which is controlled synchronously with the switch 8 by the device 9. In this manner, the characteristic of FIG. 5 can be apparently straightened as is indicated by a broken line 51 in FIG. 5.

Moreover, it is possible, in a simple manner, to combine the equipment of FIG. 3 and FIG. 4 respectively to form a device which has both the application possibilities described by making provisions whereby the rest state of the switch 31 or 40 can be switched over and keeping the switch 34 in FIG. 3 in the closed position or by providing, in FIG. 4, a switch which corresponds to switch 34 and which is provided with a by-pass switch.

After the above obvious modifications, all this is considered to fall within the scope of the invention.

I claim:

1. A method for processing picture information of a large dynamic range with a television camera tube, which comprises:
   setting a cathode potential of said camera tube in each case to a first standard value during one scanning movement of said picture information by a scanning electron beam to obtain a first standard value picture information of bright and dark parts of said picture information; and
   setting said cathode potential of said camera tube to a second value during a number of subsequent scanning movements of said picture information by said scanning electron beam to obtain second value picture information from relatively bright parts of said picture information.

2. The method according to claim 1 wherein video signals produced during said subsequent scanning movement is introduced into a memory device and wherein a video signal produced during said one scanning movement is combined with said video signals stored in said memory device to provide a combined output signal.

3. The method according to claim 1 wherein said picture information of said bright parts of said picture information is not further processed and said video signals obtained during scannings at said first value are electronically corrected to provide a video signal having a linear relationship to intensity of illumination of said television camera tube.

4. The method according to claim 1 wherein said video signals obtained during said subsequent scanning movements is combined with said video signal obtained during previous one scanning movement and stored in memory.

5. The method according to claim 1 for processing a strip-like image presented to said television camera tube and extending parallel to a scanning direction, in particular an image obtained by means of axial tomography and further including the steps of maintaining normal scanning frequency usual in a television camera tube while conforming scanning region to a position of said strip-like image.

6. A device for processing picture information of a large dynamic range with a television camera tube comprising a television camera tube having a signal electrode and a video signal output connected thereto, a charge image carrier, and a cathode by means of which said charge image carrier can be scanned by an electron beam, characterized in that said cathode is connected to a first switch controlled by a clock device (9) to apply either a first standard voltage ($V_k$) or a second voltage ($V_{ke}$) to said cathode, said second voltage corresponding to parts of said charge image carrier of relatively bright parts of picture information result in a video signal.

7. The device according to claim 6 wherein a video signal output is connected to an electronic correction device and to a device permitting said correction device to receive video signals obtained during scannings at said standard voltage of said cathode.

8. The device according to claim 6 wherein said video signal output is connected to a second switch controlled synchronously with said first switch, said second switch during scanning at said second voltage connects said video signal output to a memory device and during scanning at said first standard voltage connects said video signal to a first input of a combining device, said memory device being connected to a second input of said combining device via a third switch controlled synchronously with said first switch, said third switch being closed when said second switch connects said video signal output to said first input of said combining device.

9. The device according to claim 6 wherein said video signal output is connected via a fourth switch operated synchronously with said first switch to a first imput of a combining device during scannings at said second voltage and wherein said video signal output is connected during scannings at first standard voltage via said fourth switch (40) to a memory device which can be read out non-destructively and wherein an output of said memory device is connected to a second input of said combining device.

* * * * *